April 4, 1967        H. HEGENBART        3,312,104

INDICATING DEVICE FOR ROLLER BRAKE TESTERS

Filed Nov. 1, 1963        2 Sheets-Sheet 1

INVENTOR
HORST HEGENBART
BY Cushman, Darby & Cushman
ATTORNEYS

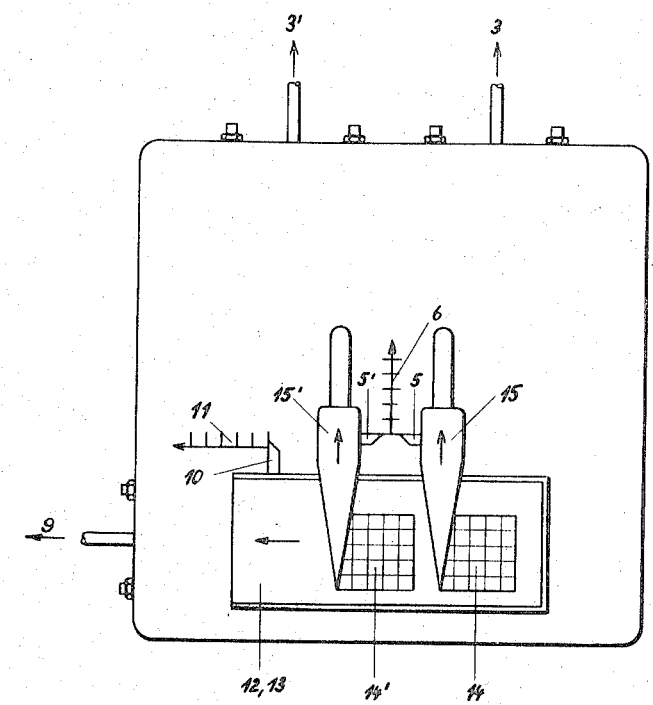
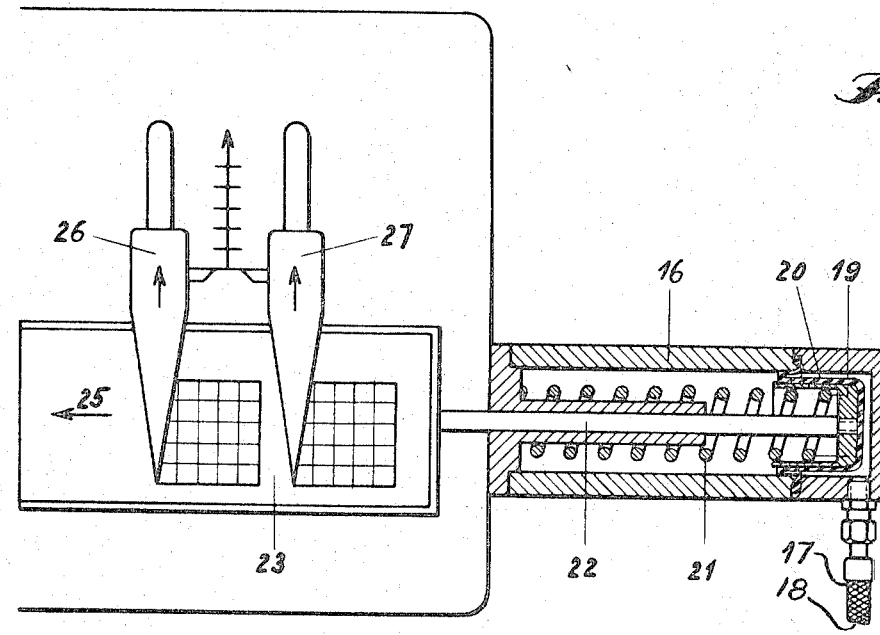

United States Patent Office 3,312,104
Patented Apr. 4, 1967

3,312,104
INDICATING DEVICE FOR ROLLER BRAKE
TESTERS
Horst Hegenbart, Heppenheim, Hesse, Germany, assignor to Gebr. Hofmann Kg., Darmstadt, Germany, a limited partnership of Germany
Filed Nov. 1, 1963, Ser. No. 320,634
5 Claims. (Cl. 73—123)

The roller brake testers commonly in use at present generally work according to the following principles:

The motor vehicle will be driven—with one or two wheels—on the test stand with two driving rollers for each wheel between which the vehicle wheel will rest. The driving rollers will now be driven by a motor and the vehicle brakes will be operated. By braking the vehicle wheel the driving rollers also will be braked and the driving motor or motors must supply a higher torque. This torque now can be measured and indicated in various ways. For instance: the motor can be swingingly suspended in such a manner that the restoring moment of the motor with respect to its mounting can be measured through a measuring spring or a hydraulic pressure measuring box. This restoring moment will now be either mechanically, hydraulically or electrically indicated on dials which have been calibrated for a direct indication of the braking power at the circumference of the vehicle wheel. In all known cases these dials are of round or arched design.

Important for the driving security of the motor vehicle is first of all that the braking power of the left and right wheel is equal as otherwise the motor vehicle, when braked, will drag to one side. A comparison of the measuring results on two round dials arranged side by side will usually be difficult and in no case can the difference between right and left braking power be perceived at one glance.

A second disadvantage of the conventional indicating devices is that the operator now will have to record the readings which in the first place is time consuming and secondly is subject to observation and recordation errors on the part of the operator.

The above mentioned disadvantages will be avoided by the indicating device described below in which FIGURE 1 shows a vertical cross-sectional view exposing the interior of the housing to observation from behind;

FIGURE 3 is a front elevation view of the apparatus of FIGURES 1 and 2; and

FIGURE 4 is a fragmentary front elevation view, similar to FIGURE 3, of a first modification adapted to indicate braking power of vehicles having air brakes.

Figure 1:
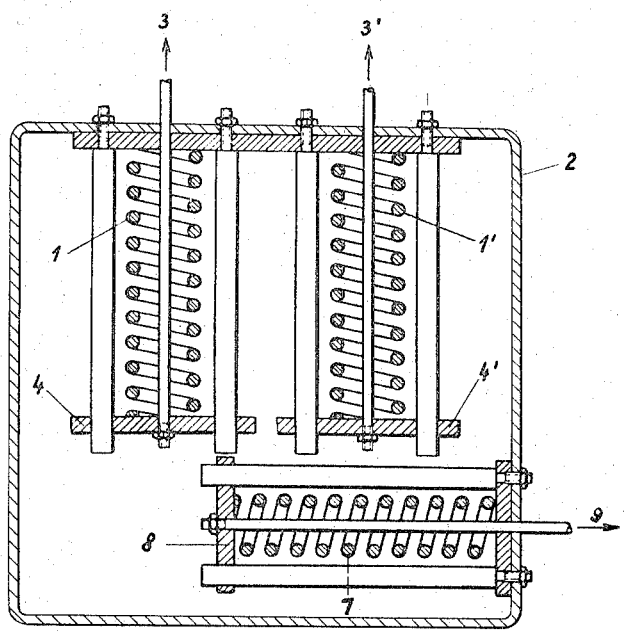
Figure 2:
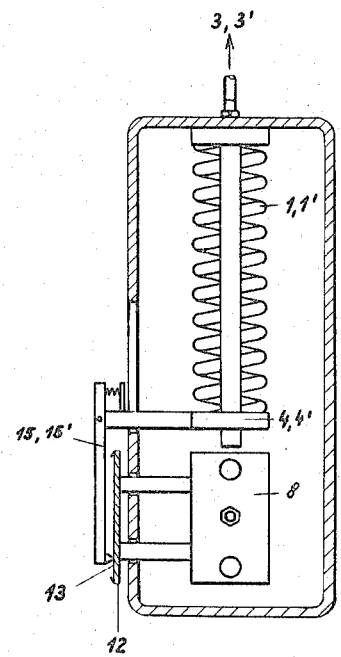
FIGURE 2 is a vertical sectional view substantially along the line 2—2 of FIGURE 1.

The indicating apparatus provided for the simultaneous measuring of both the right and left wheel braking power—incorporates two parallelly arranged measuring springs 1, 1' for the measuring of the left and right braking power respectively. These measuring springs are firmly supported on the housing 2 at one end and on the other end is free to be compressed and spread apart respectively by the measuring force 3, 3' transmitted through a low-friction system. The measuring power is a force proportionate to the torque of the roller brake tester motor and directly taken from the swingingly suspended motor housing by means of a lever arm. The movable side of the measuring springs is carried for precise, guided reciprocal sliding and with low friction in parallel with the measuring spring axis. At the same time the indicator 5, 5' for the braking power is rigidly coupled without any movable intermediate links to the movable end 4, 4' of the measuring spring. This arrangement offers the essential advantage that no loose or flexible parts whatsoever exist between measuring link (measuring spring) and indicating link (indicator with dial 6). Inaccuracies in the transmission system as for instance caused by sometimes unavoidable bearing play or elastic deformation of the transmission links do not affect the indication in any way. The zero position of the pointer thus will always be maintained. Both pointers of the two parallel measuring springs are designed in a way that they will point from two sides to a joint dial 6 or to a dial to be considered as double type dial. In addition these pointers can be equipped with difference scales from which the value of the reciprocal displacement between left and right pointer and consequently the braking power discrepancy between the left and right vehicle wheels can immediately be read off. However, even without these difference scales the simultaneous, straight-line and parallel indication of the right and left braking power is of considerably greater advantage for purposes of comparison than the arrangement of two round dials. The scale of the indicating device, for practical reasons is calibrated in a manner allowing immediate indication of the braking power on the circumference of the vehicle wheel.

Since not only the actual braking power but also the relevant pedal pressure will be essential for the judgment of a vehicle's brakes, same will also be made visible on the same indicating device. For this purpose a movable link will be inserted at the brake pedal between the pedal and the operator's foot. The respective relative path between foot and pedal accomplished by this movable link will be transmitted to the indicating box through a low-friction, mechanic or hydraulic system, for instance through remote transmission element carried in ball bearings. There, suitably perpendicular to both braking power—measuring springs 1, 1', is fitted the pedal pressure—measuring spring 7 on the movable end 3 of which pedal pressure 9 will be applied by means of the aforementioned remote transmission element. The movable end 3 of the pedal pressure measuring spring is also of the low-friction type, guided exactly parallel and rigidly connected with a pedal pressure pointer 10.

The corresponding pedal pressure therefore can be read on a straight dial 11. A recording plate 12 is rigidly connected with the pedal pressure pointer 10. A ruled record card 13 will be exactly positioned on said plate. This record card which is always provided for one measuring only—will look like this: front and reverse side each have printed thereon two coordinate systems 14, 14' in such a way that the suitably common abscissa bears the scale for the pedal pressure and that both ordinates are provided with the scale showing the braking power. One side of the record card will be used for the front wheels, the other side for the rear wheels and this both for the foot brake and the hand brake. In the case of the hand brake measuring of the pedal pressure is omitted as the respective pressure is insignificant with regard to a manually operated brake. The braking power indicators will each be provided with a stylus 15, 15' which at zero position will point to the respective origin of coordinates.

When depressing the brake pedal, the recording plate 12 will now be moved in one direction, to the left for instance while the circumferential force (braking power 3, 3') occurring at the wheel at the same time will—through the braking power measuring springs 1, 1'—move the pointers 5, 5' together with the styli in a direction perpendicular to the recording plate displacement, upward for instance. Simultaneously two diagrams will be plotted on record card 13. These diagrams unmistakably and clearly indicate the relations between pedal pressure and braking power.

The test is suitably carried out as follows:

The vehicle, brakes of which are to be tested, is driven with its front wheels into position on the roller brake tester. Next then, the record card is affixed to the recording plate and the styli (which were hinged back for practical reasons) are again set on the record card. Now, the pedal pressure gauge is affixed to the brake pedal. Upon cutting in the driving motors for the left and right wheels, the brake pedal is slowly depressed and upon reaching blocking limit, slowly released. The diagrams are plotted during this time. Then the record card is reversed and the vehicle driven forward until its rear wheels are positioned between the driving rollers of the test stand. The foot brake will then be operated and the same sequence repeated as used for the front wheels. For testing the hand brake the pedal pressure gauge will not be needed and a perpendicular line only is plotted on the record card the highest point of which indicates the braking power.

If needed, the front wheels will have to be checked in order to prevent the rear wheels from jumping the stand.

As already known, the force—exerted by the driver's foot on the brake pedal of a truck—will not be directly used for generation of the braking powers on the wheels. For this reason it is not vary suitable in this case to plot diagrams which would graphically represent the relation between operating force and left as well as right braking powers. In the case of trucks it is usual to relate the braking power to the air pressure of the brake line which in case of air pressure and air hydraulic brakes respectively will be built up and controlled respectively by depressing the brake pedal.

It is for this reason in the present case that it is suggested to use the air pressure of the brake line (so-called initiation pressure) for the lateral displacement of the recording plate.

FIGURE 4 graphically illustrates as object of the invention a device for indicating and recording respectively of braking powers of trucks. The numeral 16 indicates the housing of a measuring cylinder into which—through a tap line 17—the air pressure 18 of the brake line will be conducted. The air pressure 18 reacts on a piston 19 which is sealed against the wall of housing 16 for instance by means of a cylinder diaphragm 20. The measuring 21 is supported by the inner side of the piston head. The top of the piston is further connected with the end of a rod 22 which serves for the lateral displacement of the diagram holder 23 in the direction of arrow 25. The rod 22 is carried free from play and with low friction in a sleeve bearing connected with housing 16.

The function of the device is to have the variable air pressure 18 in the brake line exert a left-direction pressure on piston 19 which is imparted to spring 21. Hereby the right spring end will be pushed to the left by a certain path—in the direction of arrow 25—which is proportionate to the presently available air pressure 18. By this the instantaneous displacement of the diagram holder 23 also represents a direct index of the air pressure 18 in the brake line. Simultaneously with the lateral displacement of the diagram holder 23 both pointers or stylus holders 26 and 27—in accordance with the actual braking powers in the left and right wheels and with the measured values—will be moved upward and will thus plot a diagram each of the left and right braking powers as conditioned by the variable air pressure in the brake line.

What is claimed is:

1. For use with a roller-type brake tester for vehicle wheel brakes which has a first continuous output means directly proportional in magnitude to instantaneous braking force on a vehicle right wheel and a second continuous output means directly proportional in magnitude to instantaneous braking force on a vehicle left wheel, a device for receiving both of said output means and indicating braking force on both wheels linearly in close juxtaposition comprising: a frame; a first linearly, elastically extensible-contractile element having two ends; a second linearly, elastically extensible-contractile element having two ends, said first and second elements being generally parallel and side-by-side and each having one end secured to said frame; the other end of said first element connected to said first continuous output means, the other end of said second element connected to said second continuous output means; an indicator fixed to each element other end for linear movement with the respective element other end; and straight-line scale means having a datum and constructed and arranged to be swept over by said indicators whereby absolute value of braking force is indicated for each wheel as the scale distance of the respective indicator from said datum and the difference in braking force between the left and right wheels is indicated as the scale difference between the two indicators; a third linearly elastically extensible-contractile element having two ends, one end thereof being secured to said frame and said third element extending generally perpendicularly to the first and second elements in a plane generally parallel thereto; means securable on a brake pedal of the vehicle to be tested for providing a continuous output directly proportional in magnitude to instantaneous pedal pressure; the other end of said third element connected to said pedal pressure output means, a scale means holder fixed to said third element other end for linear movement therewith; said scale means comprising rectilinear coordinate graph means carried on said scale means holder; said indicators engaging said graph means and constructed and arranged to mark instantaneous position thereon whereby said indicators each plot a line relating braking force on the respective wheel to pressure on the brake pedal.

2. The device of claim 1 wherein said scale means comprise a record card having at least one left wheel rectilinear coordinate braking force versus pedal pressure graph thereon and at least one right wheel rectilinear coordinate braking force versus pedal pressure graph thereon, said record card being removably mounted on said scale means holder whereby a used record card can be removed from said scale means holder.

3. The device of claim 2 wherein said record card has plots thereon on each graph of the highest and lowest permissible braking force versus pedal pressure plot for said vehicle whereby unacceptable deviations are made immediately visually apparent upon testing of the vehicle brakes.

4. The device of claim 1 wherein said first, second and third linearly, elastically extensible-contractile elements comprise coil springs, the indicators are fixedly secured to the first and second elements, the scale means holder is fixedly secured to the third element, and said continuous output means each comprise a rod mounted on said frame for longitudinal, guided reciprocation, whereby indicator error due to play among indicators, elements, output means and the frame is effectively eliminated.

5. The device of claim 4 wherein the third element coil spring is enclosed within an air pressure measuring cylinder secured to said frame, said cylinder having one end adjacent the third element one end and an other end adjacent the third element other end; a piston received in said cylinder between said third element other end and said cylinder other end; inlet means on said cylinder between said piston and said cylinder other end, said inlet means constructed and arranged to admit vehicle air brake initiation pressure to said cylinder.

References Cited by the Examiner

UNITED STATES PATENTS

| | | | |
|---|---|---|---|
| 670,903 | 3/1901 | McTighe | 346—129 X |
| 1,766,741 | 6/1930 | Butters | 346—118 X |
| 1,822,463 | 9/1931 | Taber | 73—132 X |
| 1,873,051 | 8/1932 | Semmes | 73—124 |
| 1,964,532 | 6/1934 | Platzer | 73—117 |

RICHARD C. QUEISSER, *Primary Examiner.*

J. W. MYRACLE, *Assistant Examiner.*